United States Patent
Sato (10) Patent No.: US 9,744,876 B2
(45) Date of Patent: Aug. 29, 2017

(54) ELECTRIC VEHICLE

(71) Applicant: TOYOTA JIDOSHA KABUSHIKI KAISHA, Toyota-shi, Aichi-ken (JP)

(72) Inventor: Ryoji Sato, Toyohashi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 308 days.

(21) Appl. No.: 14/685,654

(22) Filed: Apr. 14, 2015

(65) Prior Publication Data

US 2015/0291053 A1 Oct. 15, 2015

(30) Foreign Application Priority Data

Apr. 15, 2014 (JP) .................................. 2014-083656

(51) Int. Cl.
| | |
|---|---|
| *B60L 1/00* | (2006.01) |
| *B60L 11/18* | (2006.01) |
| *H02M 1/36* | (2007.01) |
| *H02M 3/156* | (2006.01) |
| *B60L 11/00* | (2006.01) |

(52) U.S. Cl.
CPC ............ *B60L 11/1872* (2013.01); *B60L 11/00* (2013.01); *H02M 1/36* (2013.01); *H02M 3/156* (2013.01)

(58) Field of Classification Search
CPC ....... B60L 11/1872; B60L 11/00; H02M 1/36; H02M 3/156

USPC ...... 307/9.1, 10.1, 10.6, 10.7; 320/103, 104, 320/123, 134, 136, 150–154
See application file for complete search history.

(56) References Cited

U.S. PATENT DOCUMENTS

2011/0018491 A1* 1/2011 Yoshida ................ B60L 3/0046
  320/101
2015/0321577 A1* 11/2015 Murata ................. H02J 7/1438
  320/153

FOREIGN PATENT DOCUMENTS

| JP | 2005-312160 A | 11/2005 |
| JP | 2010-259217 A | 11/2010 |

* cited by examiner

*Primary Examiner* — Thomas Skibinski
(74) *Attorney, Agent, or Firm* — Andrews Kurth Kenyon LLP (57) ABSTRACT

A hybrid vehicle includes a battery, a boost converter, a battery temperature sensor, a battery current sensor, a high-voltage sensor, and a control section. The control section includes an intermittent boosting operation program which stops the boost converter when a temperature of the battery is equal to or higher than a predetermined temperature and when an absolute value of a battery current is within a range of $\pm I_0$ and which restarts the boost converter when an actual boosted voltage is outside a range from $VH_2$ to $VH_4$, and a threshold switching program that switches the threshold range to $\pm I_2$ that is wider than the range of $\pm I_0$ and switches the range from the threshold $VH_2$ to the threshold $VH_4$ to a wider range from a threshold $VH_3$ to a threshold $VH_5$ when the battery temperature is lower than the predetermined temperature.

6 Claims, 6 Drawing Sheets

ELECTRIC VEHICLE

PRIORITY INFORMATION

This application claims priority to Japanese Patent Application No. 2014-083656, filed on Apr. 15, 2014, which is incorporated herein by reference in its entirety.

BACKGROUND

Technical Field

The present invention relates to configurations of an electric vehicle.

In recent years, many hybrid vehicles or electric vehicles have been used. A hybrid vehicle includes an engine, an electric motor, and a generator, and is driven by the total output of an output from the engine and an output from the electric motor according to traveling conditions, or drives the generator using a part of the output from the engine to charge a battery, while being driven by the total output of the remaining output from the engine and the output from the electric motor, or drives the generator using the output from the engine to drive the electric motor with the power generated to drive the vehicle. Many such hybrid vehicles or electric vehicles use a method of boosting a low DC voltage of the battery into a high DC voltage using a boost converter, and supplying the high DC voltage to inverters that transmit and receive power to and from the electric motor and the generator, respectively, with the inverters converting the DC power into three-phase AC power for driving of the electric motor, allowing the electric motor to be driven, or a method of converting three-phase AC power generated by the generator into DC power to charge the battery.

On the other hand, the output voltage and output current of the battery decrease consistently with temperature. Thus, in the hybrid vehicles and the electric vehicles, when the mounted battery has a low temperature, a battery warm-up operation is often preformed to raise the temperature of the battery to a temperature appropriate for driving. Various methods have been proposed for the battery warm-up operation. For example, a method has been proposed in which the battery is warmed up by reducing the switching frequency of the boost converter to increase a ripple current in the battery (see, for example, Japanese Patent Laid-Open Publication No. 2010-259217).

However, when a battery warm-up operation is performed according to a conventional technique described in Japanese Patent Laid-Open Publication No. 2010-259217, noise in an electric circuit as a whole including the battery, a booster circuit, an inverter, and a motor generator increases due to the current ripple in the battery. For example, when the vehicle continues steady traveling (traveling at a constant speed), the driver notices the loud noise and feels uncomfortable if the engine sound and road noise are low.

SUMMARY

Thus, it is an object of the present invention to effectively warm up a battery while suppressing a possible increase in noise during steady traveling using a method different from a technique for changing the switching frequency of a boost converter.

An electric vehicle according to the present invention includes a battery, a boost converter connected to the battery, an inverter connected to the boost converter, a motor generator connected to the inverter, a temperature sensor that detects a temperature of the battery, a current sensor that detects a current in the battery, a voltage sensor that detects an actual boosted voltage provided by the boost converter, and a control section that starts and stops the boost converter. The control section includes intermittent boosting operation means for stopping the boost converter when the current in the battery is within a first threshold range and restarting the boost converter when the actual boosted voltage provided by the boost converter is outside a second threshold range, and threshold switching means for switching the first threshold range to a third threshold range wider than the first threshold range when the temperature of the battery is lower than a predetermined temperature.

In the electric vehicle according to the present invention, preferably, the threshold switching means switches the second threshold range to a fourth threshold range wider than the second threshold range when the temperature of the battery is lower than the predetermined temperature.

Preferably, the electric vehicle according to the present invention includes a vehicle speed sensor that detects a speed of the vehicle, and the intermittent boosting operation means stops the boost converter when the speed of the vehicle is equal to or higher than a predetermined speed and when the current in the battery is within the first threshold range, and restarts the boost converter when the actual boosted voltage provided by the boost converter is outside the second threshold range. Preferably, the electric vehicle includes boosting target voltage varying means for varying a boosting target voltage for the boost converter when the speed of the vehicle is lower than a predetermined speed and when the temperature of the battery is lower than the predetermined temperature.

The present invention has an advantage of enabling the battery to be effectively warmed up while suppressing a possible increase in noise during steady traveling using a method different from a technique for changing the switching frequency of the boost converter.

DETAILED DESCRIPTION

Figure 1:
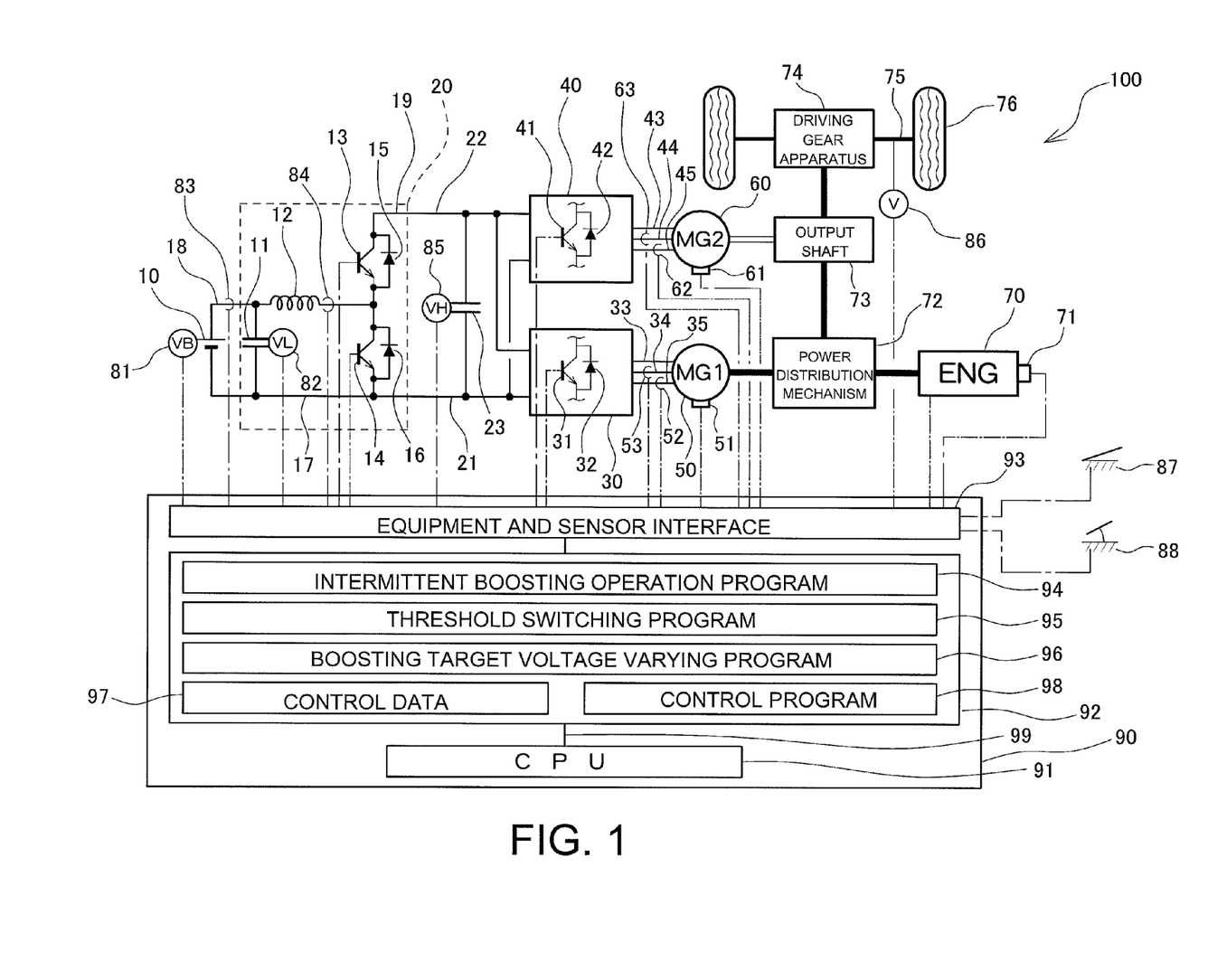
FIG. 1 is a systematic view depicting a configuration of a hybrid electric vehicle according to an embodiment of the present invention.

Embodiments of the present invention will be described below with reference to the drawings. A case will be described below where the present invention is applied to a hybrid vehicle including an engine and two motor generators. The present invention is not limited to the hybrid vehicle but is applicable to electric vehicles with no engine. As depicted in FIG. 1, a hybrid vehicle 100 according to the present embodiment includes a battery 10 that is a chargeable and dischargeable secondary battery, a boost converter 20 connected to the battery 10, a first inverter 30 connected to the boost converter 20, a second inverter 40 connected to the boost converter 20 and the first inverter 30, a first motor generator 50 that is a generator connected to the first inverter 30, a second motor generator 60 that is an electric motor connected to the second inverter 40, an engine 70 that can drive the first motor generator 50, and a control section 90 that controls the engine 70, the boost converter 20, and the first and second inverters 30 and 40.

Furthermore, as depicted in FIG. 1, the hybrid vehicle 100 includes a power distribution mechanism 72 that divides the output torque of the engine 70 into torque to an output shaft 73 to which the second motor generator 60 is connected and torque that drives the first motor generator 50, a driving gear apparatus 74 connected to the output shaft 73, an axle 75 connected to the driving gear apparatus 74, and wheels 76 attached to the axle 75. Resolvers 51, 61, and 71 are attached to the first and second motor generators 50 and 60 and the engine 70 to detect the rotation angle or rotation speed of a rotor or a crank shaft. Furthermore, a vehicle speed sensor 86 is attached to the axle 75 to detect the rotation speed of the axle to detect the vehicle speed of the hybrid vehicle 100.

The boost converter 20 includes a minus side circuit 17 connected to a minus side of the battery 10, a low-tension circuit 18 connected to a plus side of the battery 10, and a high-tension circuit 19 connected to a plus side output end of the boost converter 20. The boost converter 20 includes an upper arm switching element 13 disposed between the low-tension circuit 18 and the high-tension circuit 19, a lower arm switching element 14 disposed between the minus side circuit 17 and the low-tension circuit 18, a reactor 12 disposed in series with the low-tension circuit 18, a reactor current sensor 84 that detects a reactor current IL flowing through the reactor 12, a filter capacitor 11 disposed between the low-tension circuit 18 and the minus side circuit 17, and a low voltage sensor 82 that detects a low DC voltage VL across the filter capacitor 11. Furthermore, diodes 15 and 16 are connected in antiparallel with the switching elements 13 and 14, respectively. The boost converter 20 turns the lower arm switching element 14 on and turns the upper arm switching element 13 off to accumulate electric energy from the battery 10 in the reactor 12, and then turns the lower arm switching element 14 off and turns the upper arm switching element 13 on to raise voltage by means of the electric energy accumulated in the reactor 12. The boost converter 20 thus supplies the high DC voltage VH, which is a boosted voltage, to the high-tension circuit 19.

A battery voltage sensor 81 is attached to the battery 10 to detect a battery voltage VB. A battery current sensor 83 is attached to the low-tension circuit 18 between the battery 10 and the boost converter 20 to detect a battery current IB flowing between the battery 10 and the boost converter 20. Furthermore, battery temperature sensor 89 is attached to the battery 10 to detect the temperature TB of the battery 10. Power output by the battery 10 is (battery voltage VB×battery current IB), and thus the battery voltage sensor 81 and the battery current sensor 83 include power detection means for detecting power transmitted and received between the battery 10 and the boost converter 20. Additionally, power (battery voltage VB×battery current IB) output by the battery 10 is equal to power (low DC voltage VL×reactor current IL) passing through the reactor 12, and the battery voltage VB is equal to the low DC voltage VL across the filter capacitor 11 detected by the low voltage sensor 82. Thus, like the battery voltage sensor 81 and the battery current sensor 83, the low voltage sensor 82 and the reactor current sensor 84 include power detection means for detecting power transmitted and received between the battery 10 and the boost converter 20.

The first inverter 30 and the second inverter 40 include a common high-tension circuit 22 connected to the high-tension circuit 19 of the boost converter 20 and a common minus side circuit 21 connected to the minus side circuit 17 of the boost converter 20. A smoothing capacitor 23 is disposed between the high-tension circuit 22 and the minus side circuit 21 to connect the high-tension circuit 22 and the minus side circuit 21 together in order to smooth a DC current supplied by the boost converter 20. The high DC voltage VH, which is a boosted voltage supplied to the inverters 30 and 40, is detected by a high voltage sensor 85 that detects a voltage across the smoothing capacitor 23. Thus, the high DC voltage VH detected by the high voltage sensor 85 is an actual boosted voltage (actual boosted voltage VHr). In the present embodiment, the actual boosted voltage VHr supplied to the first and second inverters 30 and 40 are the same voltage. The first inverter 30 converts DC power received from the boost converter 20 into three-phase first AC power and supplies the three-phase first AC power to the first motor generator 50. The first inverter 30 further converts three-phase first AC power generated by the first motor generator 50 into DC power to charge the battery 10 via the boost converter 20 or supply the resultant DC power to the second inverter 40. The second inverter 40 converts the DC power received from the boost converter 20 into three-phase second AC power and supplies the three-phase AC power to the second motor generator 60. The second inverter 40 further converts three-phase second AC power generated by the second motor generator 60 into DC power to charge the battery 10 via the boost converter 20 or supply the resultant DC power to the first inverter 30.

The first inverter 30 internally includes a total of six switching elements 31 for a U phase, a V phase, and a W phase on an upper arm and a lower arm, respectively. Diodes 32 are connected in antiparallel with the respective switching elements 31 (in FIG. 1, only one of the six switching elements and one of the diodes are illustrated and the other switching elements and diodes are omitted). Output lines 33, 34, and 35 are each attached between a corresponding one of the switching elements for the U, V, and W phases on the upper arm and a corresponding one of the switching elements for the U, V, and W phases on the lower arm in the first inverter 30 so that a U phase current, a V phase current, and a W phase current are output through the output lines 33, 34, and 35, respectively. The output lines 33, 34, and 35 are connected to input terminals of the first motor generator 50 for the U, V, and W phases. Furthermore, in the present embodiment, current sensors 53 and 52 are attached to the V and W phase output lines 34 and 35 to detect the respective currents. No current sensor is attached to the U phase output line 33. However, for a three-phase alternating current, the sum of the U, V, and W phase currents is zero, and thus, the U phase current value can be computationally determined from a V phase current value and a W phase current value.

The configurations of the second inverter 40 (a switching element 41, a diode 42, and output lines 43, 44, and 45) and current sensors 62 and 63 are similar to the configurations of the first inverter 30 and the current sensors 52 and 53 described above. Furthermore, the following are attached to the hybrid vehicle 100: an accelerator pedal depression amount detection sensor 87 and a brake pedal depression amount detection sensor 88 that detect the respective depression amounts of an accelerator pedal and a brake pedal.

As depicted in FIG. 1, the control section 90 includes a CPU 91 that executes arithmetic processing, a storage section 92, and an equipment and sensor interface 93. The CPU 91 that executes arithmetic processing, the storage section 92, and the equipment and sensor interface 93 are computers connected together via a data bus 99. The storage section 92 internally stores control data 97 for the hybrid vehicle 100, a control program 98, and an intermittent boosting operation program 94 that is intermittent boosting operation means described below, a threshold switching program 95 that is threshold switching means, and a boosting target voltage varying program 96 that is boosting target voltage varying means. Furthermore, the switching elements 13 and 14 of the boost converter 20 and the switching elements 31 and 41 of the first and second inverter 30 and 40, described above, are connected to the control section 90 through the equipment and sensor interface 93 and configured to operate in accordance with commands from the control section 90. Additionally, the control section 90 receives, through the equipment and sensor interface 93, outputs from the battery voltage sensor 81 and the battery temperature sensor 89, the low voltage sensor 82, the high voltage sensor 85, the battery current sensor 83, the reactor current sensor 84, the current sensors 52, 53, 62, and 63, the resolvers 51, 61, and 71, the vehicle speed sensor 86, the accelerator pedal depression amount detection sensor 87, and the brake pedal depression amount detection sensor 88.

Figure 2:
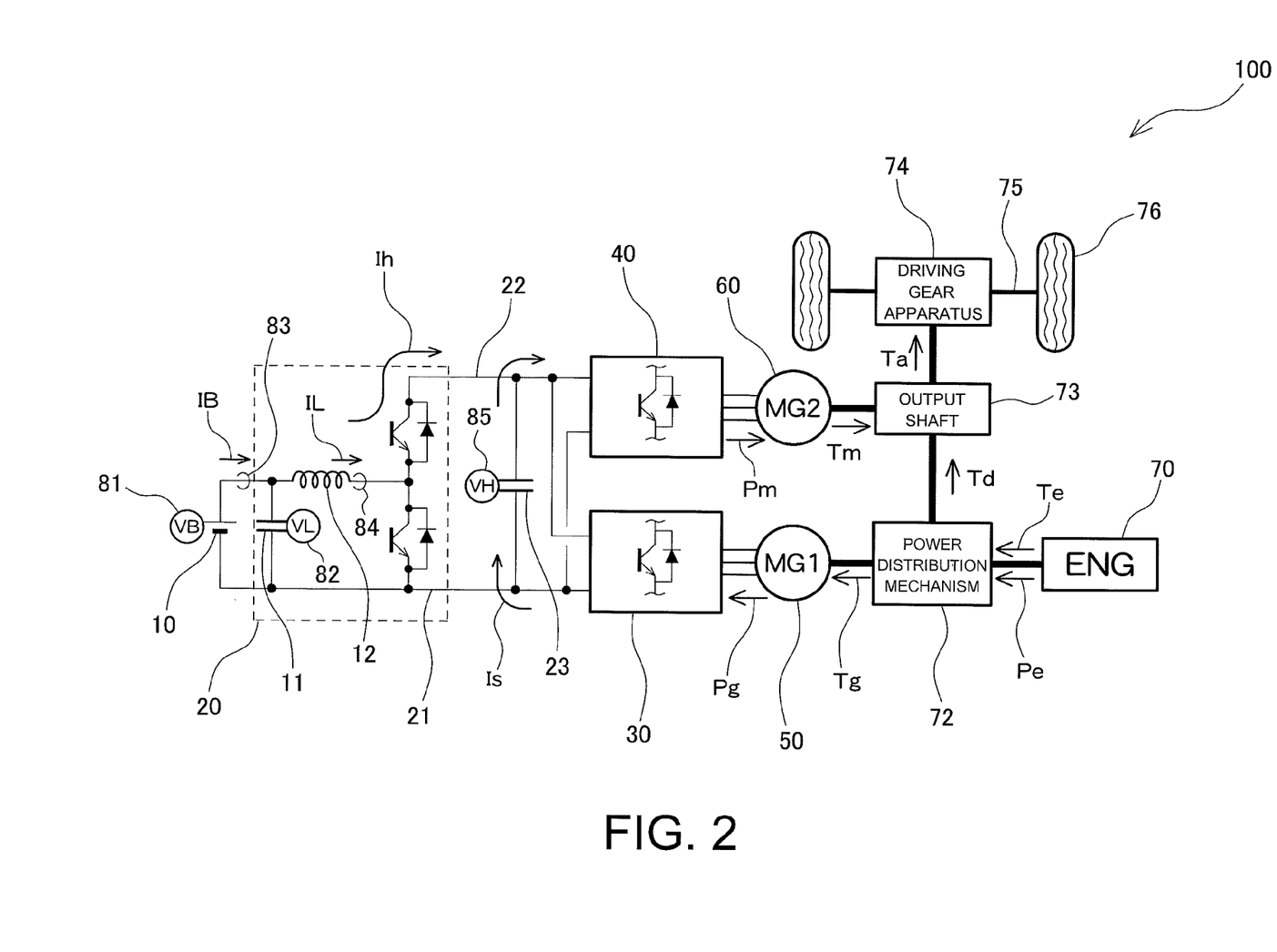
FIG. 2 is an explanatory view depicting flows of mechanical power, electric power, and current in the hybrid electric vehicle according to the embodiment of the present invention.

Before description of a warm-up operation for the battery 10 performed while the hybrid vehicle 100 configured as described above is traveling steadily (at a constant speed), basic operations of the hybrid vehicle 100 will be described in brief with reference to FIG. 2. The hybrid vehicle 100 has various driving modes. A driving mode will be described below in which the hybrid vehicle 100 is driven by outputs from the engine 70 and the second motor generator 60.

The engine 70 emits an engine output Pe and engine torque Te. The engine torque Te is divided by the power distribution mechanism 72 into first torque Tg that drives the first motor generator 50, and engine transmission torque Td that drives the wheels 76 via the output shaft 73 and the driving gear apparatus 74. The power distribution mechanism 72 may be, for example, a planetary gear apparatus. The first motor generator 50 functions as a generator and is driven by the first torque Tg from the power distribution mechanism 72 to output three-phase AC generated power Pg to the first inverter 30. The first inverter 30 converts the input AC generated power Pg into DC power of the high DC voltage VH and outputs the DC power to the high-tension circuit 22 and the minus side circuit 21. The output direct current Is is input to the second inverter 40 via the smoothing capacitor 23.

On the other hand, the battery current IB of the battery voltage VB supplied by the battery 10 charges the filter capacitor 11 of the boost converter 20 to set the voltage across the filter capacitor 11 to the low DC voltage VL. Thus, with the battery 10 and the boost converter 20 connected together and with the filter capacitor 11 charged, the battery voltage VB is the same voltage as the low DC voltage VL. As described above, the boost converter 20 turns the lower arm switching element 14 on and turns the upper arm switching element 13 off to accumulate electric energy from the battery 10 in the reactor 12. The boost converter 20 then turns the lower arm switching element 14 off and turns the upper arm switching element 13 on to boost the voltage by means of the electric energy accumulated in the reactor 12. The boost converter 20 thus outputs the high DC voltage VH, which is a boosted voltage, to the high-tension circuit 19. At this time, the battery 10 supplies the boost converter 20 with power (battery voltage VB×battery current IB) or power (low DC voltage VL×reactor current IL). The boost converter 20 outputs the supplied power as power (high DC voltage VH×mean current Ih). The control section 90 controls the on and off duty of the switching elements 13 and 14 to adjust the high DC voltage VH to a boosting target voltage $VH_1$.

The direct current Ih of the high DC voltage VH output by the boost converter 20 merges with the direct current Is of the high DC voltage VH output by the first inverter 30. The resultant direct current Is is input to the second inverter 40. The second inverter 40 converts the input DC power of the high DC voltage VH and the direct current (Is+Ih) into three-phase supply power Pm and supplies the three-phase supply power Pm to the second motor generator 60 functioning as a motor. The second motor generator 60 is driven by the supply power Pm and supplies motor torque Tm to the output shaft 73. Then, the above-described engine transmission torque Td and motor torque Tm are input to the output shaft 73, and the total torque Ta is transmitted to the driving gear apparatus 74. The wheels 76 are driven by the total torque Ta of the torques Td and Tm output by the engine 70 and the second motor generator 60. In the description of the power, power in a direction toward the motor generators 50 and 60 is positive, whereas power in a direction from the motor generators to the inverters 30 and 40 is negative. Thus, the generated power Pg of the first motor generator 50 is negative, whereas the supply power Pm to the second motor generator 60 is positive. Furthermore, power output from the battery 10 to the first and second motor generators is positive, whereas power (charge power) input to the battery 10 is negative.

When the hybrid vehicle 100 needs only a low driving force, the DC power of the high DC voltage VH and the direct current Is output by the first inverter 30 is reduced in voltage by the boost converter 20 instead of being supplied to the second inverter 40, the battery 10 is charged with the DC power. Furthermore, when the hybrid vehicle 100 is braked, the second motor generator 60 also functions as a generator, and a generated AC current (negative) is converted into DC power by the second inverter 40, with which the battery 10 is charged.

Now, with reference to FIG. 3, FIG. 4, FIG. 5A, FIG. 5B, and FIG. 5C, a battery warm-up operation will be described in which the battery 10 is warmed up while the hybrid vehicle 100 according to the present invention is traveling steadily (at a constant speed). First, an operation of the control section 90 will be described which is performed in a traveling condition where the high DC voltage VH decreases when the boost converter 20 is stopped. The "steady traveling" refers to an operation condition where the supply power Pm (positive) supplied to the second motor generator 60 is approximately equal in absolute value to the generated power Pg (negative) generated by the first motor generator 50, so that the traveling condition can be maintained for a certain amount of time even after the boost converter 20 is stopped. For example, for a vehicle provided with what is called a "cruise switch" that allows the vehicle to travel automatically at a constant speed, the "steady traveling" corresponds to a condition where the "cruise switch" is on and a condition where the vehicle is traveling at a constant high speed (50 to 60 km/h) on an expressway (traveling at a predetermined speed or higher). The operation to be described is an operation performed when, after cold starting of the hybrid vehicle 100, the vehicle starts such steady traveling as described above before the battery 10 reaches a predetermined temperature $T_1$ (while the temperature is lower than $T_1$).

Figure 5A:
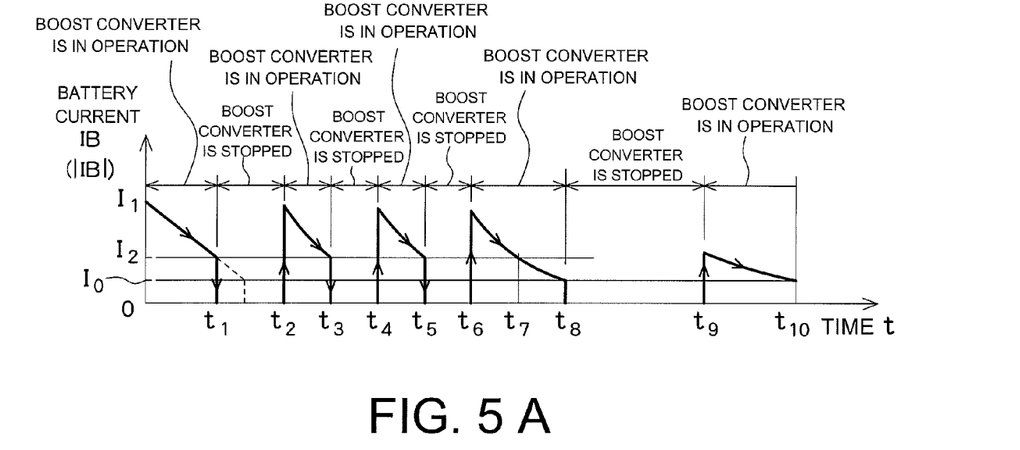
FIG. 5A is a graph depicting temporal changes in battery current during the operation depicted in FIG. 3.
Figure 5B:
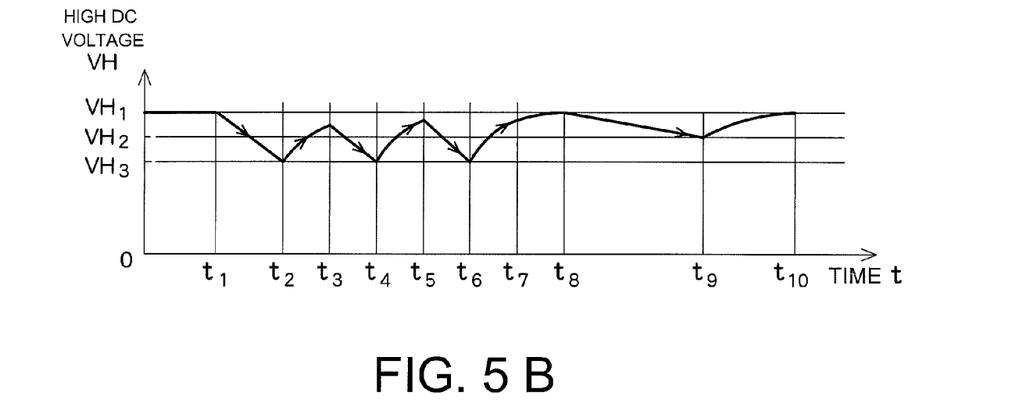
FIG. 5B is a graph depicting temporal changes in high DC voltage during the operation depicted in FIG. 3.

At a point in time 0 (initial condition) depicted in FIG. 5A, the boost converter 20 is in operation, and as depicted in FIG. 5B, the actual boosted voltage VHr, which is the high DC voltage VH detected by the high voltage sensor 85, is equal to the boosting target voltage $VH_1$. Furthermore, at the point in time 0 (initial condition), the battery current IB output by the battery 10 (the current detected by the battery current sensor 83) is denoted by $I_1$, and the temperature TB of the battery 10 detected by the battery temperature sensor 89 is denoted by $T_0$. The voltage of the battery 10 detected by the battery voltage sensor 81 is the battery voltage VB, and thus, the battery 10 supplies the boost converter 20 with DC power of ($VB \times I_1$). Additionally, the engine 70 is in an operation condition, the first motor generator 50 is driven by the engine 70 as a generator, and the generated power Pg from the first motor generator 50 is $Pg_0$ (negative). As described with reference to FIG. 2, the generated power $Pg_0$ is converted by the first inverter 30 into the DC power ($VH_1 \times Is$)=$Pg_0$ of the boosting target voltage $VH_1$ and the direct current Is, which is input to the second inverter 40. Then, the second inverter 40 receives the total DC power of the DC power ($VH_1 \times Is$)=$Pg_0$ from the first inverter 30 and the DC power ($VB \times I_1$) from the battery 10. The second inverter 40 converts the total DC power into the supply power Pm (positive) to be supplied to the second motor generator 60 and outputs the supply power Pm. In other words, the supply power Pm to be supplied to the second motor generator 60 is (($VH_1 \times Is$)+($VB \times I_1$))=($Pg_0$)+($VB \times I_1$). The absolute value of the supply power Pm (positive) supplied to the second motor generator 60 is larger than the absolute value of the generated power $Pg_0$ (negative) generated by the first motor generator 50. Deficient power ($VB \times I_1$) (positive) is supplied by the battery 10.

Figure 3:
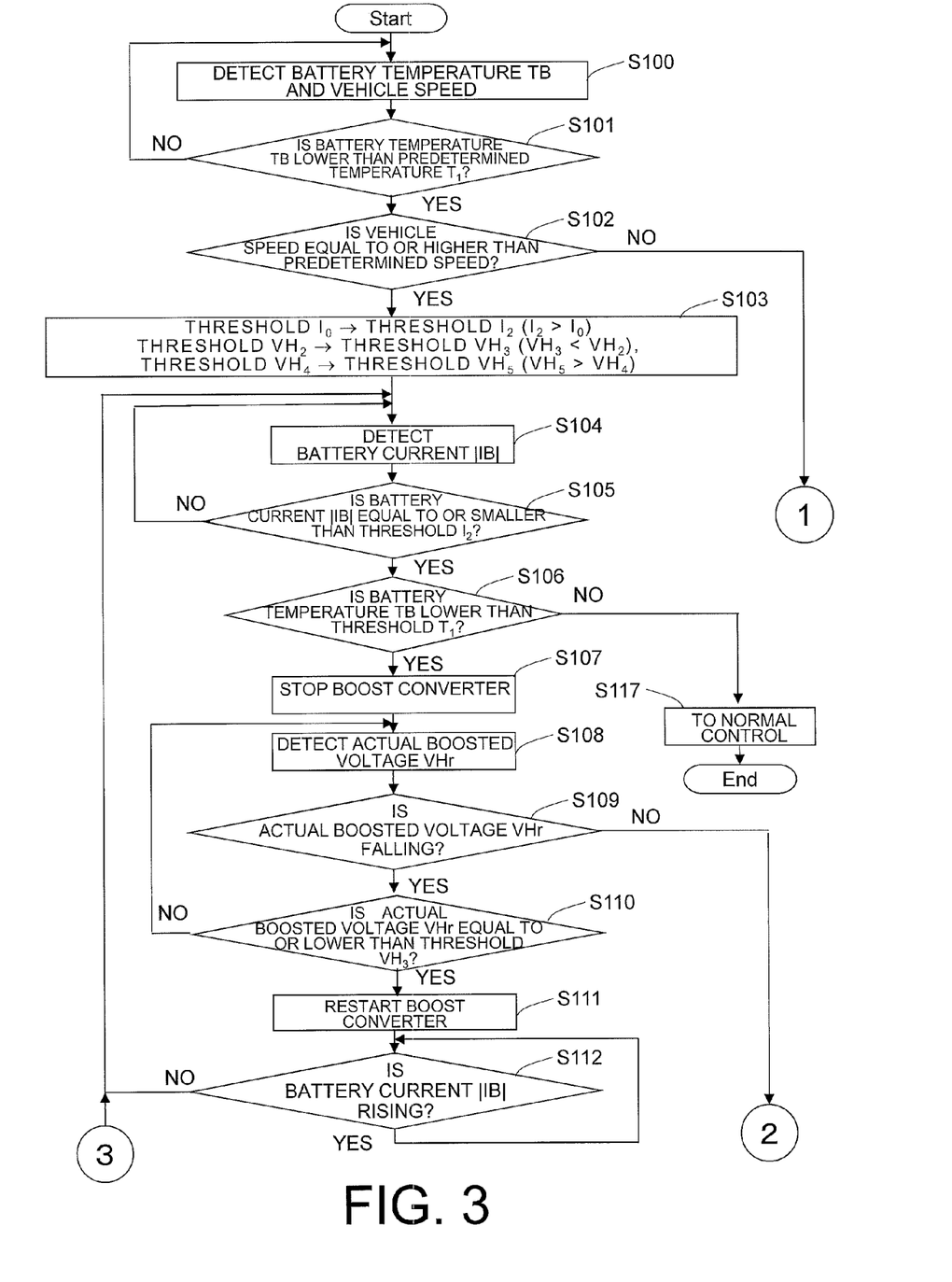
FIG. 3 is a flowchart depicting an operation of the hybrid vehicle according to the embodiment of the present invention.

As depicted in step S100 in FIG. 3, the control section 90 acquires the temperature TB of the battery 10 from the battery temperature sensor 89 and the vehicle speed from the vehicle speed sensor 86. As depicted in step S101 in FIG. 3, the control section 90 determines whether the temperature TB of the battery 10 is lower than the predetermined temperature $T_1$. When the temperature of the battery 10 is not lower than the predetermined temperature $T_1$ but is equal to or higher than the predetermined temperature $T_1$, the control section 90 returns to step S101 in FIG. 1 to continue monitoring the temperature TB of the battery 10. As described above, the initial temperature of the battery 10 at the point in time 0 is $T_0$, which is lower than the predetermined temperature $T_1$ as depicted in FIG. 5C. Thus, the control section 90 proceeds to step S102 in FIG. 3 to determine whether the vehicle speed is equal to or higher than a predetermined speed. When the vehicle speed is lower than the predetermined speed, it is often difficult to effectively warm up the battery 10 using a method of intermittently stopping the boost converter 20 or switching a threshold for restarting to allow the boost converter 20 to perform more frequent intermittent operations as described below. Thus, when the vehicle speed is not equal to or higher than the predetermined speed, the control section 90 jumps from a terminal 1 in FIG. 3 to a terminal 1 in FIG. 4 to execute a boosting target voltage varying program 96 depicted in FIG. 1 and changing the boosting target voltage $VH_1$, as depicted in step S118 in FIG. 4. Furthermore, when the vehicle speed is equal to or higher than the predetermined speed, it is possible to effectively warm up the battery 10 using a method of intermittently stopping the boost converter 20 or switching a threshold for restarting to allow the boost converter 20 to perform more frequent intermittent operations as described below. Thus, the control section 90 proceeds to step S103 in FIG. 3 to execute the intermittent boosting operation program 94 and the threshold switching program 95 depicted in FIG. 1.

As depicted in step S103 in FIG. 3, the control section 90 switches a threshold for the absolute value (|IB|) of the battery current ID which allows the control section 90 to determine to stop the boost converter 20 from a threshold $I_0$ for the case where the temperature of the battery 10 is equal to or higher than the predetermined temperature $T_1$ to a threshold $I_2$ larger than the threshold $I_0$. Furthermore, the control section 90 switches a threshold for the high DC voltage VH which allows the control section 90 to determine to restart the boost converter 20 if the high DC voltage VH lowers when the boost converter 20 is stopped, from a threshold $VH_2$ to a threshold $VH_3$ smaller than the threshold $VH_2$. Furthermore, the control section 90 switches a threshold for the high DC voltage VH which allows the control section 90 to determine to restart the boost converter 20 if the high DC voltage VH rises when the boost converter 20 is stopped, from a threshold $VH_4$ to a threshold $VH_5$ larger than the threshold $VH_4$. In other words, when the temperature of the battery 10 is lower than the predetermined temperature $T_1$, the control section 90 switches the range of current values within which the boost converter 20 is stopped, from ($\pm I_0$) that is a first threshold range to ($\pm I_2$) that is a third threshold range wider than the first threshold range. Furthermore, when the temperature of the battery 10 is lower than the predetermined temperature $T_1$, the control section 90 switches the range of high DC voltage VH within which the boost converter 20 is restarted, from (at most $VH_2$ and at least $VH_4$, outside the range from $VH_2$ to $VH_4$) that falls outside the second threshold range to (at most $VH_3$ and at least $VH_5$, outside the range from $VH_3$ to $VH_5$) that falls outside a fourth threshold range wider than the second threshold range.

When the supply power Pm supplied to the second motor generator 60 decreases gradually from $Pm_0$ in the initial condition to $Pm_1$, the absolute value (|IB|) of the battery current IB also decreases gradually from $I_1$ at the point in time 0, as depicted from point in time 0 to point in time $t_1$ in FIG. 5A. Then, when the absolute value (|IB|) of the battery current IB reaches $I_2$ within the third threshold range at the point in time $t_1$ depicted in FIG. 5A, the control section 90 determines that the absolute value (|IB|) of the battery current IB is equal to or smaller than the threshold $I_2$ (has fallen within the third threshold range ($\pm I_2$)) in step S105 in FIG. 3. At this time, the absolute value of the supply power $Pm_1$ (positive) supplied to the second motor generator 60 is slightly larger than the absolute value of the generated power $Pg_0$ (negative) generated by the first motor generator 50, and power (|$Pm_2$|−|$Pg_0$|=$VB \times I_2$) (positive) is supplied by the battery 10. Since $I_2$ is larger than $I_0$, power ($VB \times I_2$) (positive) supplied to the second motor generator 60 by the battery 10 is higher than power ($VB \times I_0$) (positive) supplied to the second motor generator 60 by the battery 10 when the temperature of the battery 10 is equal to or higher than the predetermined temperature $T_1$.

Then, as depicted in step S106 in FIG. 3, the control section 90 checks again whether the temperature TB of the battery 10 is lower than the predetermined temperature $T_1$ before the boost converter 20 is stopped. In the present operation, at the point in time $t_1$, the temperature TB of the battery 10 is lower than the predetermined temperature $T_1$ but is only slightly higher than the initial temperature $T_0$, as depicted in FIG. 5C. Thus, the control section 90 proceeds to step S107 in FIG. 3 to stop the boost converter 20. When the temperature TB of the battery 10 is equal to or higher than the predetermined temperature $T_1$, the control section 90 proceeds to step S117 in FIG. 3 to end the warm-up operation for the battery 10 to return to normal control.

When the control section 90 outputs a command to stop the boost converter 20 as depicted in step S107 in FIG. 3, the upper arm switching element 13 and the lower arm switching element 14 of the boost converter 20 are kept off, and the boost converter 20 is disconnected from the first and second inverters 30 and 40. When the boost converter 20 is stopped, the control section 90 detects the actual boosted voltage VHr using the high voltage sensor 85 as depicted in step S108 in FIG. 3. Then, as depicted in step S109 in FIG. 3, the control section 90 determines whether the actual boosted voltage VHr has fallen or risen. As described above, in the present operation, at the point in time $t_1$ when the boost converter 20 is stopped, the absolute value of the supply power $Pm_1$ (positive) supplied to the second motor generator 60 is larger than the absolute value of the generated power $Pg_0$ (negative) generated by the first motor generator 50. Consequently, when the boost converter 20 is stopped at the point in time $t_1$, the smoothing capacitor 23 subsequently discharges power corresponding to the difference between $Pm_1$ and $(|Pg_0|)$. Thus, as depicted in FIG. 5B, the actual boosted voltage VHr falls gradually from the boosting target voltage $VH_1$. Therefore, in step S109 in FIG. 3, in the present operation, the control section 90 determines that the actual boosted voltage VHr has fallen and proceeds to step S110 in FIG. 3 to determine whether the actual boosted voltage VHr is equal to or lower than the threshold $VH_3$. When the actual boosted voltage VHr is not equal to or lower than the threshold $VH_3$, the control section 90 returns to step S108 in FIG. 3 to continue monitoring the actual boosted voltage VHr. In the meantime, the actual boosted voltage VHr continues falling.

When the boost converter 20 is stopped, the power $(VB \times I_2)$ (positive) supplied to the second motor generator 60 by the battery 10 is higher than the power $(VB \times I_0)$ (positive) supplied to the second motor generator 60 by the battery 10 when the temperature of the battery 10 is equal to or higher than the predetermined temperature $T_1$. Consequently, power discharged by the smoothing capacitor 23 is also higher than power discharged by the smoothing capacitor 23 when the temperature of the battery 10 is equal to or higher than the predetermined temperature $T_1$. Thus, the actual boosted voltage VHr falls faster than when the temperature of the battery 10 is equal to or higher than the predetermined temperature $T_1$ (the rate of decrease of the actual boosted voltage VHr increases). Therefore, time needed for the actual boosted voltage VHr to fall from the target value $VH_1$ to the threshold $VH_3$ is shorter than when the temperature of the battery 10 is equal to or higher than the predetermined temperature $T_1$. Then, the period of charge and discharge of the battery 10 shortens to increase a loss in the battery 10. This allows the battery 10 to be warmed up faster.

As depicted in FIG. 5B, when the actual boosted voltage VHr reaches the threshold $VH_3$ at a point in time $t_2$, the control section 90 determines in step S110 in FIG. 3 that the actual boosted voltage VHr has reached the threshold $VH_3$ or a smaller value. The control section 90 then outputs a command to restart the boost converter 20 as depicted in step S111 in FIG. 3. When the boost converter 20 is restarted, the control section 90 feeds back the deviation between the actual boosted voltage VHr and the target voltage $VH_1$ to allow the on and off duty of the switching elements 13 and 14 of the boost converter 20 to be controlled to adjust the actual boosted voltage VHr to the boosting target voltage $VH_1$. Thus, immediately after the point in time $t_2$ with a significant deviation between the actual boosted voltage VHr and the target voltage $VH_1$, the battery current IB temporarily rises sharply beyond the threshold $I_2$. Subsequently, the smoothing capacitor 23 is charged with power supplied by the battery 10 and the actual boosted voltage VHr rises gradually and approaches the boosting target voltage $VH_1$. Then, the deviation between the actual boosted voltage VHr and the target voltage $VH_1$ decreases, thus reducing the battery current IB.

The threshold $VH_3$ for the high DC voltage VH which allows the control section 90 to determine to restart the boost converter 20 is smaller than the threshold $VH_2$ for the case where the temperature of the battery 10 is equal to or higher than the predetermined temperature $T_1$. Consequently, the deviation $(VH_1-VH_3)$ between the actual boosted voltage VHr and the target voltage $VH_1$ at the point in time $t_2$ is larger than the deviation $(VH_1-VH_2)$ in the case of the temperature of the battery 10 being equal to or higher than the predetermined temperature $T_1$. Thus, the extent to which the battery current IB exceeds the threshold $I_2$ at the point in time $t_2$ in FIG. 5A is higher than when the temperature of the battery 10 is equal to or higher than the predetermined temperature $T_1$. Then, the loss in the battery 10 increases to allow the battery 10 to be warmed up faster.

As depicted in step S112 in FIG. 3, the control section 90 monitors the battery current IB while the battery current IB is rising, and returns to step S104 in FIG. 3 when the battery current IB starts to decrease. The control section 90 then detects the battery current IB (absolute value (|IB|)) to determine whether the battery current is equal to or smaller than the threshold $I_2$. As depicted in step S105 in FIG. 3, when the battery current IB is not equal to or smaller than the threshold $I_2$, the control section 90 returns to step S104 in FIG. 3 to continue monitoring the battery current IB. Then, when the battery current IB reaches the threshold $I_2$ as depicted at the point in time $t_3$ in FIG. 5A, the control section 90 determines whether the temperature of the battery 10 is lower than the predetermined temperature $T_1$, as depicted in step S106 in FIG. 3. As depicted in FIG. 5C, battery temperature TB at the point in time $t_3$ is approximately intermediate between the initial temperature $T_0$ and the predetermined temperature $T_1$ and is lower than the predetermined temperature $T_1$. Hence, as described above, the control section 90 proceeds to step S107 in FIG. 3 to stop the boost converter 20 and monitor the actual boosted voltage VHr as depicted in steps S108 and S109 in FIG. 3. When the actual boosted voltage VHr falls to the threshold $VH_3$ as depicted in step S110 in FIG. 3, the control section 90 restarts the boost converter 20 as depicted in step S111 in FIG. 3.

As described above, in the present operation, the control section 90 repeats the operation in which, if the temperature of the battery 10 is lower than the predetermined temperature $T_1$, the control section 90 stops the boost converter 20 when the battery current IB is equal to or smaller than the threshold $I_2$, and restarts the boost converter 20 when the actual boosted voltage VHr is equal to or smaller than the threshold $VH_3$. Thus, the battery current IB output by the battery 10 varies as depicted in FIG. 5A, and the battery temperature TB of the battery 10 rises gradually as depicted in FIG. 5C.

Then, when the battery temperature TB is equal to or higher than the predetermined temperature $T_1$ as depicted at a point in time $t_7$ in FIG. 5C, the control section 90 determines that the battery 10 has been fully warmed up and proceeds from step S106 in FIG. 3 to step S117 in FIG. 3 to return to the normal operation. Upon returning to the normal operation, the control section 90 restores the thresholds that were changed in step S103 in FIG. 3 to the initial settings. In other words, the control section 90 restores the threshold from the threshold $I_2$ for the absolute value (|IB|) of the battery current IB which allows the control section 90 to determine to stop the boost converter 20 to the threshold $I_0$ for the case where the temperature of the battery 10 is equal to or higher than the predetermined temperature $T_1$. Furthermore, the control section 90 switches the threshold for the high DC voltage VH which allows the control section 90 to determine to restart the boost converter 20 if the high DC voltage VH falls when the boost converter 20 is stopped, from the threshold $VH_3$ to the initial threshold $VH_2$.

Therefore, as depicted in FIG. 5A, the control section 90 does not stop the boost converter 20 even when the battery current IB reaches $I_2$ at the point in time $t_7$, and stops the boost converter 20 when the battery current IB reaches the threshold $I_0$ at a point in time $t_8$. Thus, when the battery current IB is small, the difference between the generated power Pg of the first motor generator 50 and the power Pm supplied to the second motor generator 60 is also small. Consequently, the rate of decrease of the high DC voltage VH observed when the boost converter 20 is stopped is lower than the rate of decrease of the high DC voltage VH observed when the boost converter 20 is stopped if the battery current IB reaches the threshold $I_2$. The high DC voltage VH falls slowly. Then, when the actual boosted voltage VHr falls to the threshold $VH_2$ at a point in time $t_9$, the control section 90 restarts the boost converter 20 to raise the high DC voltage VH. The control section 90 subsequently performs a normal, similar intermittent operation for the boost converter.

As described above, in the operation according to the present embodiment, when the temperature of the battery 10 is low, the control section 90 switches the threshold for the absolute value (|IB|) of the battery current IB which allows the control section 90 to determine to stop the boost converter 20, to the threshold $I_2$, which is larger than the threshold $I_0$ for the case where the temperature of the battery 10 is equal to or higher than the predetermined temperature $T_1$. Then, the rate of decrease of the actual boosted voltage VHr is increased to reduce the period of charge and discharge of the battery 10, increasing the loss in the battery 10 to allow the battery 10 to be warmed up faster. Furthermore, when the temperature of the battery 10 is low, the control section 90 switches the threshold $VH_2$ for the high DC voltage VH which allows the control section 90 to determine to restart the boost converter 20, to the small threshold $VH_3$. This increases the peak of the battery current IB provided when the boost converter 20 is restarted, increasing the loss in the battery 10 to allow the battery 10 to be warmed up faster. Thus, the operation according to the present embodiment enables the warm-up operation for the battery 10 to be performed without a reduction in carrier frequency. Consequently, the battery 10 can be effectively warmed up, with a possible increase in noise suppressed. Furthermore, in the above description, the operation according to the present embodiment involves switching of the threshold for the absolute value (|IB|) of the battery current IB which allows the control section 90 to determine to stop the boost converter 20 and switching of the threshold for the high DC voltage VH which allows the control section 90 to determine to restart the boost converter 20. However, the battery 10 may be warmed up such that the vehicle performs only the switching of the threshold for the absolute value (|IB|) of the battery current IB which allows the control section 90 to determine to stop the boost converter 20, to shorten the period of charge and discharge of the battery 10 to increase the loss in the battery 10. Alternatively, the battery 10 may be warmed up such that the vehicle performs only the switching of the threshold for the high DC voltage VH which allows the control section 90 to increase the peak of the battery current IB provided when the boost converter 20 is restarted, increasing the loss in the battery 10.

Now, with reference to FIG. 6A, FIG. 6B, and FIG. 6C, an operation of the control section 90 will be described which is performed in a traveling condition where the high DC voltage VH rises when the boost converter 20 is stopped. Aspects of the operation similar to the aspects of the embodiment described above with reference to FIG. 3, FIG. 4, FIG. 5A, FIG. 5B, and FIG. 5C will be described in brief.

Figure 6A:
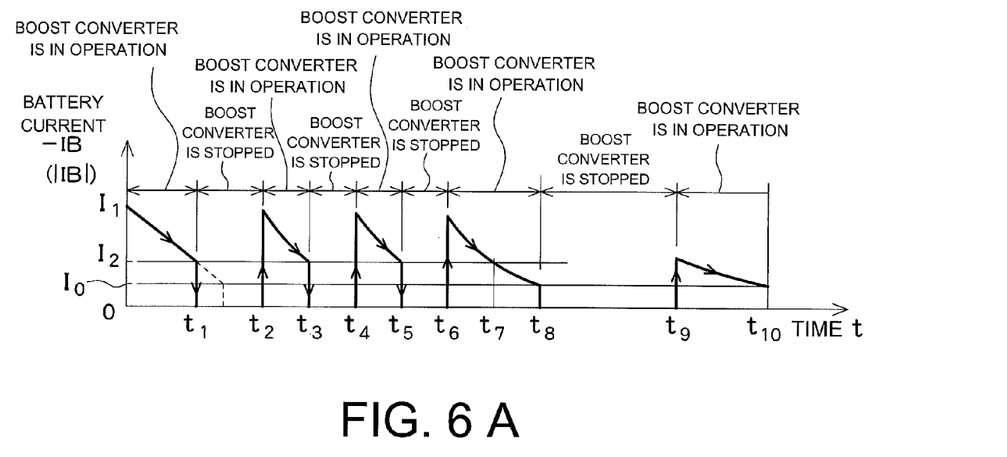
FIG. 6A is a graph depicting temporal changes in battery current during the operation depicted in FIG. 4.

In the present operation, in the initial condition at the point in time 0 in FIG. 6A, the battery current IB input by the battery 10 (for charging) is $I_1$ (negative), and the temperature TB of the battery 10 is $T_0$. The voltage of the battery 10 is the battery voltage VB, and thus, the battery 10 receives DC power of (VB×$I_1$) (negative) from the boost converter 20 (for charging). Furthermore, the engine 70 is in operation, and the first motor generator 50 is driven by the engine 70 as a generator. The generated power Pg of the first motor generator 50 is $Pg_0$ (negative). As described with reference to FIG. 2, the generated power $Pg_0$ is converted by the first inverter 30 into DC power ($VH_1$×Is) $Pg_0$ of the boosting target voltage $VH_1$ and the direct current Is, which is then input to the second inverter 40. On the other hand, the second motor generator 60 is supplied with the power Pm (positive). In the present operation, the absolute value of the generated power $Pg_0$ (negative) of the first motor generator 50 is larger than the absolute value of the power Pm (positive) supplied to the second motor generator 60. Thus, the battery 10 is charged with power corresponding to the difference (|Pm|−|$Pg_0$|). Therefore, charge power (negative) for the battery 10 is (VB×(|Pm|−|$Pg_0$|)).

The control section 90 executes the intermittent boosting operation program 94 depicted in FIG. 1 to acquire the temperature TB of the battery 10 using the battery temperature sensor 89 as depicted in step S101 in FIG. 3. The control section 90 then determines whether the temperature TB of the battery 10 is lower than the predetermined temperature $T_1$, as shown in step S102 in FIG. 3. The control section 90 then proceeds to step S103 in FIG. 3 to execute the threshold switching program 95 depicted in FIG. 1.

The control section 90 switches the threshold for the absolute value (|IB|) of the battery current IB which allows the control section 90 to determine to stop the boost converter 20, from the threshold $I_0$ for the case where the temperature of the battery 10 is equal to or higher than the predetermined temperature $T_1$ to the threshold $I_2$, which is larger than the threshold $I_0$. The control section 90 further switches the threshold for the high DC voltage VH which allows the control section 90 to determine to restart the boost converter 20 if the high DC voltage VH rises when the boost converter 20 is stopped, from a threshold $VH_4$ to a threshold $VH_5$ larger than the threshold $VH_4$.

When the supply power Pm supplied to the second motor generator 60 increases gradually from $Pm_0$ in the initial condition to $Pm_2$, the amount of power charged to the battery 10 decreases. Thus, as depicted from the point in time 0 to the point in time $t_1$ in FIG. 6A, the absolute value (|IB|) of the battery current IB decreases gradually from $I_1$ at the point in time 0. When the absolute value (|IB|) of the battery current IB reaches $I_2$ within the third threshold range (the battery current IB reaches $-I_2$) at the point in time $t_1$ depicted in FIG. 5A, the control section 90 determines in step S105 in FIG. 3 that the absolute value (|IB|) of the battery current IB is equal to or smaller than the threshold $I_2$ (has fallen within the third threshold range ($\pm I_2$)). At this time, the absolute value of the generated power $Pg_0$ (negative) generated by the first motor generator 50 is slightly larger than the absolute value of the supply power $Pm_2$ (positive) supplied to the second motor generator 60, and power ($|Pm_2|-|Pg_0|=VB\times I_2$) (negative) is input to the battery 10 (for charging). Since $I_2$ is larger than the absolute value of the power ($VB\times I_2$) (negative) supplied to the second motor generator 60 by the battery 10 is higher than the absolute value of the power ($VB\times I_0$) (negative) supplied to the second motor generator 60 by the battery 10 when the temperature of the battery 10 is equal to or higher than the predetermined temperature $T_1$.

Then, as depicted in step S106 in FIG. 3, the control section 90 checks again whether the temperature TB of the battery 10 is lower than the predetermined temperature $T_1$ before the boost converter 20 is stopped. The control section 90 proceeds to step S107 in FIG. 3 to stop the boost converter 20.

When the boost converter 20 is stopped, the control section 90 detects the actual boosted voltage VHr using the high voltage sensor 85 as depicted in step S108 in FIG. 3. Then, as depicted in step S109 in FIG. 3, the control section 90 determines whether the actual boosted voltage VHr has fallen or risen. As described above, in the present operation, at the point in time $t_1$ when the boost converter 20 is stopped, the absolute value of the generated power $Pg_0$ (negative) generated by the first motor generator 50 is slightly larger than the absolute value of the supply power $Pm_2$ (positive) supplied to the second motor generator 60. Consequently, when the boost converter 20 is stopped at the point in time $t_1$, the smoothing capacitor 23 is subsequently charged with power corresponding to the difference between $Pm_2$ and ($|Pg_0|$). Thus, as depicted in FIG. 6B, the actual boosted voltage VHr rises gradually from the boosting target voltage $VH_1$. Therefore, in step S109 in FIG. 3, in the present operation, the control section 90 determines that the actual boosted voltage VHr has risen and proceeds to steps S113 and S114 in FIG. 4 to determine whether the actual boosted voltage VHr is equal to or higher than the threshold $VH_5$. When the actual boosted voltage VHr is not equal to or higher than the threshold $VH_5$, the control section 90 returns to step S113 in FIG. 4 to continue monitoring the actual boosted voltage VHr. In the meantime, the actual boosted voltage VHr continues rising.

When the boost converter 20 is stopped, the absolute value of the power ($VB\times I_2$) (negative) supplied to the second motor generator 60 by the battery 10 is larger than the absolute value of the power ($VB\times I_0$) (negative) supplied to the second motor generator 60 by the battery 10 when the temperature of the battery 10 is equal to or higher than the predetermined temperature $T_1$. Consequently, power provided to the smoothing capacitor 23 for charging is also higher than power provided to the smoothing capacitor 23 for charging when the temperature of the battery 10 is equal to or higher than the predetermined temperature $T_1$. Thus, the actual boosted voltage VHr rises faster than when the temperature of the battery 10 is equal to or higher than the predetermined temperature $T_1$ (the rate of increase of the actual boosted voltage VHr increases). Therefore, time needed for the actual boosted voltage VHr to rise from the target value $VH_1$ to the threshold $VH_5$ is shorter than when the temperature of the battery 10 is equal to or higher than the predetermined temperature $T_1$. Then, the period of charge and discharge of the battery 10 shortens to increase the loss in the battery 10. This allows the battery 10 to be warmed up faster.

Figure 4:
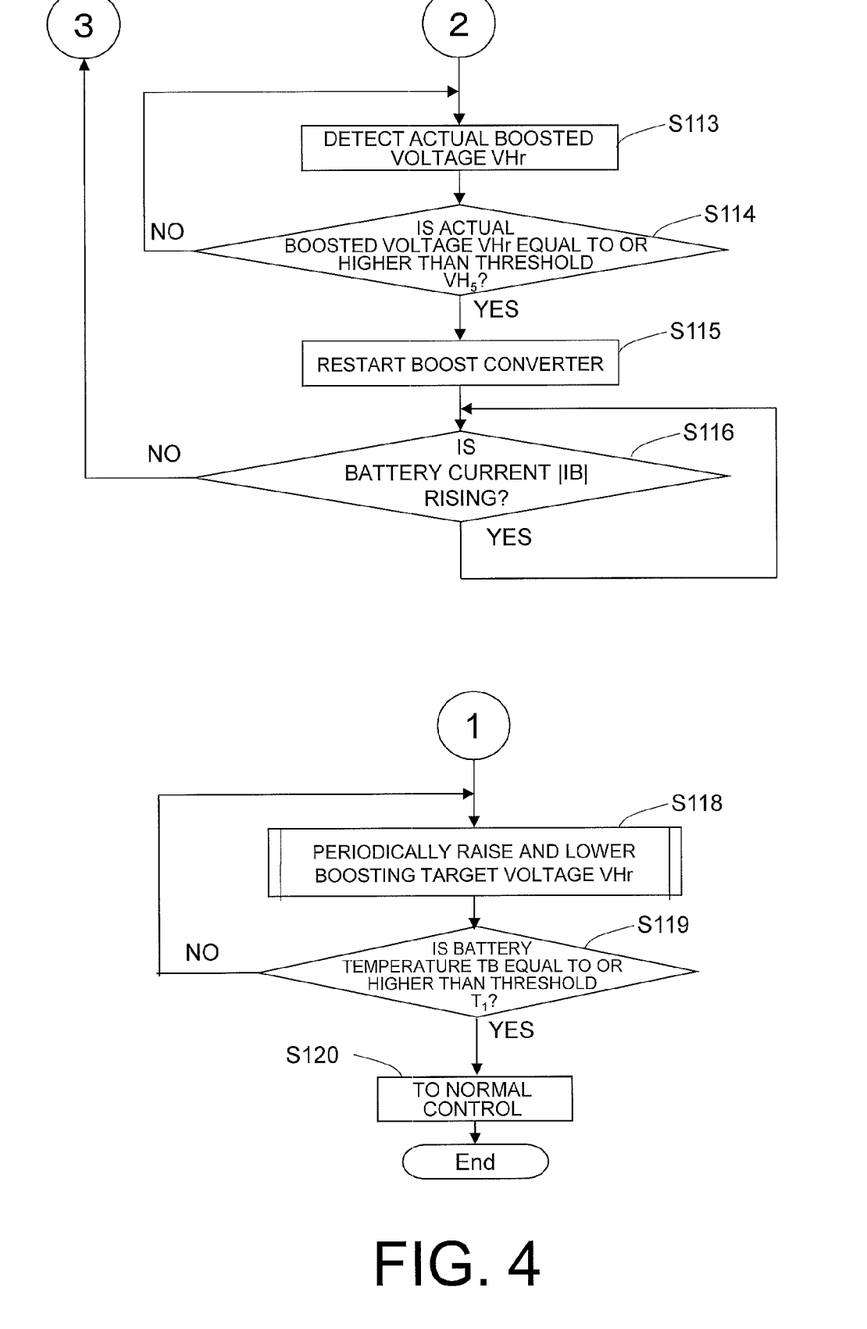
FIG. 4 is a flowchart depicting another operation of the hybrid vehicle according to the embodiment of the present invention.
Figure 5C:
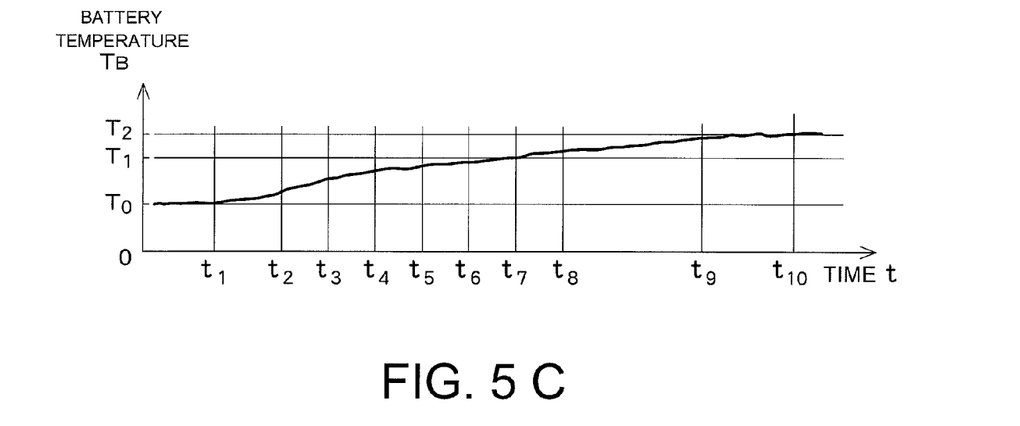
FIG. 5C is a graph depicting temporal changes in battery temperature during the operation depicted in FIG. 3.
Figure 6B:
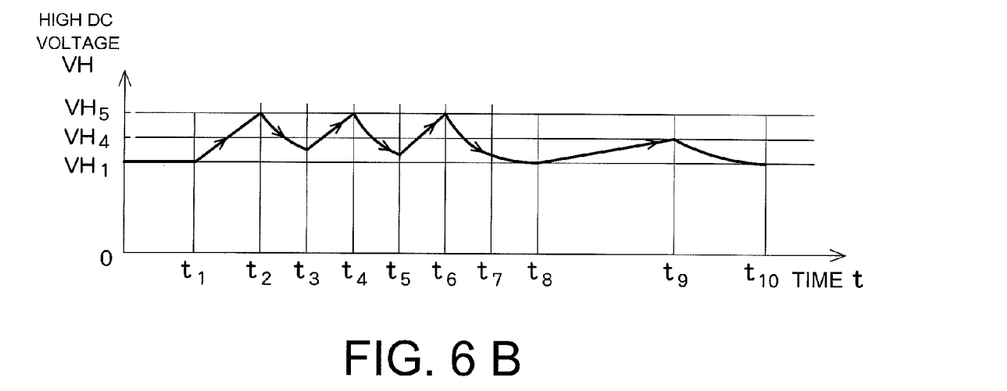
FIG. 6B is a graph depicting temporal changes in high DC voltage during the operation depicted in FIG. 4.
Figure 6C:
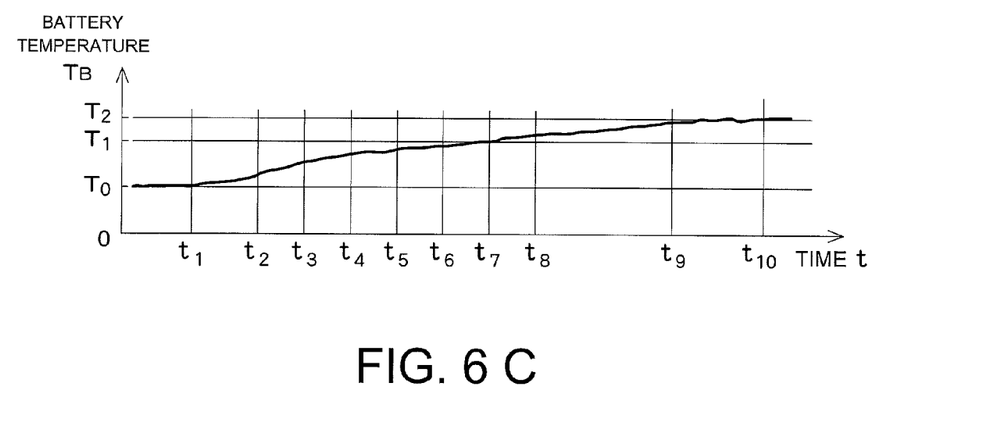
FIG. 6C is a graph depicting temporal changes in battery temperature during the operation depicted in FIG. 4.

As depicted in FIG. 6B, when the actual boosted voltage VHr reaches the threshold $VH_5$ at a point in time $t_2$, the control section 90 determines in step S114 in FIG. 4 that the actual boosted voltage VHr has reached the threshold $VH_5$ or a larger value. The control section 90 then outputs a command to restart the boost converter 20 as depicted in step S115 in FIG. 4. When the boost converter 20 is restarted, the control section 90 feeds back the deviation between the actual boosted voltage VHr and the target voltage $VH_1$ to allow the on and off duty of the switching elements 13 and 14 of the boost converter 20 to be controlled to adjust the actual boosted voltage VHr to the boosting target voltage $VH_1$. Thus, immediately after the point in time $t_2$ with a significant deviation, the absolute value (|IB|) of the battery current IB temporarily rises sharply beyond the threshold $I_2$. Subsequently, when charge stored in the smoothing capacitor 23 is provided to the battery 10 for charging, the actual boosted voltage VHr falls gradually and approaches the boosting target voltage $VH_1$. Then, the deviation between the actual boosted voltage VHr and the target voltage $VH_1$ decreases, thus reducing the absolute value (|IB|) of the battery current IB.

The threshold $VH_5$ for the high DC voltage VH which allows the control section 90 to determine to restart the boost converter 20 is larger than the threshold $VH_4$ for the case where the temperature of the battery 10 is equal to or higher than the predetermined temperature $T_1$. Consequently, the deviation ($VH_5-VH_1$) between the actual boosted voltage VHr and the target voltage $VH_1$ at the point in time $t_2$ is larger than the deviation ($VH_4-VH_1$) in the case of the temperature of the battery 10 being equal to or higher than the predetermined temperature $T_1$. Thus, the degree by which the battery current IB exceeds the threshold $I_2$ at the point in time $t_2$ in FIG. 5A is higher than when the temperature of the battery 10 is equal to or higher than the predetermined temperature $T_1$. Then, the loss in the battery 10 increases to allow the battery 10 to be warmed up faster.

As depicted in step S116 in FIG. 4, the control section 90 monitors the battery current IB while the absolute value (|IB|) of the battery current IB is increasing (the IB is increasing toward the negative side), and returns to step S104 in FIG. 3 when the absolute value (|IB|) of the battery current IB starts to decrease (starts to flow from the negative side to the positive side). The control section 90 then detects the battery current IB (absolute value (|IB|)) to determine whether the absolute value (|IB|) of the battery current IB is equal to or smaller than the threshold $I_2$. As depicted in step S105 in FIG. 3, when the absolute value (|IB|) of the battery current IB is not equal to or smaller than the threshold $I_2$, the control section 90 returns to step S104 in FIG. 3 to continue monitoring the battery current 1B. Then, when the absolute value (|IB|) of the battery current IB reaches the threshold $I_2$ as depicted at the point in time $t_3$ in FIG. 5A, the control section 90 determines whether the temperature of the battery 10 is lower than the predetermined temperature $T_1$, as depicted in step S106 in FIG. 3. As depicted in FIG. 6C, battery temperature TB at the point in time $t_3$ is approximately intermediate between the initial temperature $T_0$ and the predetermined temperature $T_1$ and is lower than the predetermined temperature $T_1$. Hence, as described above, the control section 90 proceeds to step S107 in FIG. 3 to stop the boost converter 20 and monitor the actual boosted voltage VHr as depicted in steps S113 and S114 in FIG. 4. When the actual boosted voltage VHr falls to the threshold $VH_5$ as depicted in step S114 in FIG. 4, the control section 90 restarts the boost converter 20 as depicted in step S115 in FIG. 4.

As described above, in the present operation, the control section 90 repeats the operation in which, if the temperature of the battery 10 is lower than the predetermined temperature $T_1$, the control section 90 stops the boost converter 20 when the absolute value (|IB|) of the battery current IB is equal to or smaller than the threshold $I_2$, and restarts the boost converter 20 when the actual boosted voltage VHr is equal to or larger than the threshold $VH_5$. Thus, the battery current IB (negative) input to the battery 10 varies as depicted in FIG. 6A, and the battery temperature TB of the battery 10 rises gradually as depicted in FIG. 6C. Then, when the battery temperature TB is equal to or higher than the predetermined temperature $T_1$ as depicted at the point in time $t_7$ in FIG. 6C, the control section 90 determines that the battery 10 has been fully warmed up and proceeds from step S106 in FIG. 3 to step S117 in FIG. 3 to return to the normal operation.

In the above-described operation according to the present embodiment, the control section 90 works as described below, as is the case with the operation described with reference to FIG. 3, FIG. 4, FIG. 5A, FIG. 5B, and FIG. 5C. When the temperature of the battery 10 is low, the control section 90 switches the threshold for the absolute value (|IB|) of the battery current IB which allows the control section 90 to determine to stop the boost converter 20, from the threshold $I_0$ for the case where the temperature of the battery 10 is equal to or higher than the predetermined temperature $T_1$, to the threshold $I_2$, which is larger than the threshold $I_0$. Then, the rate of increase of the actual boosted voltage VHr is increased to reduce the period of charge and discharge of the battery 10, increasing the loss in the battery 10 to allow the battery 10 to be warmed up faster. Furthermore, when the temperature of the battery 10 is low, the control section 90 switches the threshold $VH_4$ for the high DC voltage VH which allows the control section 90 to determine to restart the boost converter 20, to the large threshold $VH_5$. This increases the peak of the battery current IB provided when the boost converter 20 is restarted, increasing the loss in the battery 10 to allow the battery 10 to be warmed up faster. Thus, the operation according to the present embodiment enables the warm-up operation for the battery 10 to be performed without a reduction in carrier frequency, as is the case with the above-described embodiment. Consequently, the battery 10 can be effectively warmed up, with a possible increase in noise suppressed. In the present embodiment, as is the case with the above-described embodiment, the battery 10 may be warmed up such that the vehicle exclusively performs the switching of the threshold for the absolute value (|IB|) of the battery current IB which allows the control section 90 to determine to stop the boost converter 20 or the switching of the threshold for the high DC voltage VH, to increase the loss in the battery 10.

As described above, in traveling in a low speed area, for example, in an urban area, the hybrid vehicle often repeats stop, start, acceleration, deceleration, and stop and infrequently performs steady traveling as described above. Thus, it is often difficult to effectively warm up the battery 10 using a method of intermittently stopping the boost converter 20 or switching a threshold for restarting to allow the boost converter 20 to perform more frequent intermittent operations as described with reference to FIGS. 3 to 6C.

Thus, in step S103 in FIG. 3, when the vehicle speed is not equal to or higher than a predetermined speed (the vehicle speed is lower than the predetermined speed), for example, the vehicle speed is equal to or lower than 30 to 40 (km/h), the control section 90 jumps to step S118 in FIG. 4 to execute the boosting target voltage varying program 96 depicted in FIG. 1 and changing the boosting target voltage $VH_1$. As depicted in step S118 in FIG. 4, the control section 90 periodically raises and lowers the boosting target voltage $VH_1$ of the boost converter 20. Thus, the battery current IB output by the battery 10 is repeatedly output (when the IB is positive and the battery 10 is discharged) and input (when the IB is negative and the battery 10 is charged) to suffer a loss, resulting in heat generation and warm-up. In step S119 in FIG. 4, the control section 90 determines whether the temperature of the battery 10 is equal to or higher than the predetermined temperature $T_1$. When the temperature of the battery 10 is not equal to or higher than the predetermined temperature $T_1$, the control section 90 returns to step S118 in FIG. 4 to continue executing the boosting target voltage varying program 96. When the temperature of the battery 10 is equal to or higher than the predetermined temperature $T_1$, the control section 90 proceeds to step S120 in FIG. 4 to end the execution of the boosting target voltage varying program 96 to return to normal control. This action has an advantage of reliably allowing the battery 10 to be warmed up even while the hybrid vehicle 100 is traveling at low speed.

During steady traveling (during traveling at a predetermined speed or a higher speed), the hybrid vehicle 100 according to the present embodiment effectively executes warming up of the battery 10 while suppressing a possible increase in noise using a method of executing the threshold switching program 95 to switch the thresholds that allow the boost converter 20 to be intermittently stopped and restarted and executing the intermittent boosting operation program 94 to allow the boost converter 20 to perform more frequent intermittent operations. During low-speed traveling (traveling at a speed lower than the predetermined speed), the hybrid vehicle 100 warms up the battery 10 by periodically raising and lowering the boosting target voltage $VH_1$. Thus, the hybrid vehicle 100 has an advantage of enabling the battery 10 to be effectively warmed up regardless of the traveling condition of the hybrid vehicle 100.

The present invention is not limited to the above-described embodiments but embraces all changes and modifications that do not depart from the technical scope or essence of the present invention defined by the claims. For example, in the description of the embodiments, the boost converter 20 is stopped when the absolute value of the battery current IB detected by the battery current sensor 83 is equal to or smaller than the threshold $I_2$ or $I_0$. However, the boost converter 20 may be stopped when the reactor current IL detected by the reactor current sensor 84 connected in series with the battery current sensor 83 is equal to or smaller than the threshold $I_2$ or $I_0$.

What is claimed is:
1. An electric vehicle comprising:
a battery;
a boost converter connected to the battery;
an inverter connected to the boost converter;

a motor generator connected to the inverter;
a temperature sensor that detects a temperature of the battery;
a current sensor that detects a current in the battery;
a voltage sensor that detects an actual boosted voltage provided by the boost converter; and
a control section that starts and stops the boost converter, wherein the control section comprises:
intermittent boosting operation means for stopping the boost converter when the current in the battery falls within a first threshold range and restarting the boost converter when the actual boosted voltage provided by the boost converter falls outside a second threshold range; and
threshold switching means for switching the first threshold range to a third threshold range wider than the first threshold range when the temperature of the battery is lower than a predetermined temperature.

2. The electric vehicle according to claim 1, wherein the threshold switching means switches the second threshold range to a fourth threshold range wider than the second threshold range when the temperature of the battery is lower than the predetermined temperature.

3. The electric vehicle according to claim 2, further comprising a vehicle speed sensor that detects a speed of the vehicle;
wherein the intermittent boosting operation means stops the boost converter when the speed of the vehicle is equal to or higher than a predetermined speed and when the current in the battery is within the first threshold range, and restarts the boost converter when the actual boosted voltage provided by the boost converter is outside the second threshold range.

4. The electric vehicle according to claim 2, wherein the control section comprises:
boosting target voltage varying means for varying a boosting target voltage for the boost converter when the speed of the vehicle is lower than a predetermined speed and when the temperature of the battery is lower than the predetermined temperature.

5. The electric vehicle according to claim 1, further comprising a vehicle speed sensor that detects a speed of the vehicle;
wherein the intermittent boosting operation means stops the boost converter when the speed of the vehicle is equal to or higher than a predetermined speed and when the current in the battery is within the first threshold range, and restarts the boost converter when the actual boosted voltage provided by the boost converter is outside the second threshold range.

6. The electric vehicle according to claim 1, wherein the control section comprises:
boosting target voltage varying means for varying a boosting target voltage for the boost converter when the speed of the vehicle is lower than a predetermined speed and when the temperature of the battery is lower than the predetermined temperature.

* * * * *

UNITED STATES PATENT AND TRADEMARK OFFICE
CERTIFICATE OF CORRECTION

PATENT NO. : 9,744,876 B2  
APPLICATION NO. : 14/685654  
DATED : August 29, 2017  
INVENTOR(S) : Ryoji Sato Page 1 of 1

It is certified that error appears in the above-identified patent and that said Letters Patent is hereby corrected as shown below:

At Column 08, Line 14, change from "current ID which" to "current IB which"

At Column 12, Line 36, change from "$(VH_1 \times Is)Pg_o$" to "$(VH_1 \times Is)=Pg_o$"

At Column 12, Line 46, change from "$(VB \times (|Pm|-|Pg_o|)$" to "$(VB \times I_1)=(|P_m| - |P_{go}|)$"

At Column 14, Line 63, change from "current 1B." to "current IB."

Signed and Sealed this  
Twenty-fourth Day of July, 2018

Andrei Iancu  
*Director of the United States Patent and Trademark Office*